United States Patent
Fluch et al.

(10) Patent No.: US 11,745,247 B2
(45) Date of Patent: Sep. 5, 2023

(54) METHOD FOR STACKING SHEET METAL PARTS MADE FROM AN ELECTRICAL STEEL STRIP OR SHEET TO FORM LAMINATION STACKS

(71) Applicant: voestalpine Stahl GmbH, Linz (AT)

(72) Inventors: Ronald Fluch, Linz (AT); Peter Atzmüller, Linz (AT)

(73) Assignee: voestalpine Stahl GmbH, Linz (AT)

( * ) Notice: Subject to any disclaimer, the term of this patent is extended or adjusted under 35 U.S.C. 154(b) by 0 days.

(21) Appl. No.: 17/909,127

(22) PCT Filed: Mar. 2, 2021

(86) PCT No.: PCT/EP2021/055226
§ 371 (c)(1),
(2) Date: Sep. 2, 2022

(87) PCT Pub. No.: WO2021/175875
PCT Pub. Date: Sep. 10, 2021

(65) Prior Publication Data
US 2023/0100562 A1    Mar. 30, 2023

(30) Foreign Application Priority Data
Mar. 2, 2020 (EP) .................................... 20160522

(51) Int. Cl.
*B21D 39/03* (2006.01)
*H01F 41/02* (2006.01)
(Continued)

(52) U.S. Cl.
CPC ............ *B21D 39/03* (2013.01); *B21D 43/22* (2013.01); *H01F 41/0233* (2013.01); *H02K 15/12* (2013.01)

(58) Field of Classification Search
CPC .......... Y10T 29/49908; Y10T 29/4998; Y10T 29/49982; Y10T 29/49863;
(Continued)

(56) References Cited

U.S. PATENT DOCUMENTS

| 7,192,498 B2 * | 3/2007 | Howland ............ B29C 66/1122 156/304.3 |
| 8,274,663 B2 * | 9/2012 | Pan ........................ G01B 11/06 271/263 |

(Continued)

FOREIGN PATENT DOCUMENTS

| CH | 703695 A1 | 3/2012 |
| DE | 102012001744 A1 | 8/2013 |
| DE | 102016000399 A1 | 7/2016 |

*Primary Examiner* — Sarang Afzali
*Assistant Examiner* — Darrell C Ford

(57) ABSTRACT

A method for stacking sheet metal parts composed of an electrical steel strip or sheet in order to form lamination stacks, each with a stack height within a tolerance range from a predetermined desired stack height, including stacking the sheet metal parts, which have a hot-melt adhesive varnish layer on at least one flat side, preheating the hot-melt adhesive varnish layers and putting the hot-melt adhesive varnish layers under pressure, then determining the stack height of the individual lamination stacks and adjusting the stack height if necessary, and then finally heating the hot-melt adhesive varnish layers.

15 Claims, 4 Drawing Sheets

(51) Int. Cl.
*B21D 43/22* (2006.01)
*H02K 15/12* (2006.01)

(58) Field of Classification Search
CPC .. Y10T 29/49865; B21D 39/03; B21D 43/22; H01F 41/0233; H02K 15/12; B29C 66/961; B32B 41/00
USPC ........... 29/428, 505, 527.1, 527.2, 446, 447; 156/64, 364, 378
See application file for complete search history.

(56) References Cited

U.S. PATENT DOCUMENTS

2008/0256788 A1* 10/2008 Glazebrook .............. B64F 5/10
29/700
2015/0165746 A1* 6/2015 Prebil ................. B29C 65/5057
156/308.2
2017/0001258 A1 1/2017 Hildebrand et al.

\* cited by examiner

METHOD FOR STACKING SHEET METAL PARTS MADE FROM AN ELECTRICAL STEEL STRIP OR SHEET TO FORM LAMINATION STACKS

TECHNICAL FIELD

The invention relates to a method for stacking sheet metal parts made from an electrical steel strip or sheet, which has a hot-melt adhesive varnish layer—more particularly a backlack layer—on at least one of its flat sides, in order to form lamination stacks, each having a stack height hp within a tolerance range Δh from a predetermined desired stack height hs.

PRIOR ART

When producing components that are coated with a hot-melt adhesive layer and are made from an electrical steel strip or sheet and used to form lamination stacks, the stack height is usually determined after the baking, i.e. a heating of the lamination stack to a temperature above a baking temperature of the hot-melt adhesive varnish with a correspondingly sufficient baking time. After this, lamination stacks with unsuitable stack heights are separated out. Alternatively, the height can also be determined after the stacking and before the heating for the baking procedure, separating out the lamination stacks with insufficient stack heights before the baking or adjusting their heights in order to reduce lamination stack waste. But this method also has the disadvantage that it is not possible to predict with certainty the stack height that the lamination stacks will have after a baking procedure. This is due to a multiplicity of influence factors. On the one hand, the height of each individual sheet metal part can vary, for example within a range of several μm; on the other hand, the height of the hot-melt adhesive varnish layer can also vary. In the worst case scenario, these factors can add up, as a result of which the stack height of the baked lamination stacks can vary significantly. This reduces the reproducibility of such methods for producing lamination stacks with a stack height hp within a tolerance range Δh from a predetermined desired stack height hs.

US 2017/001258 A1 therefore proposes controlling the process parameters in the baking of the lamination stack. For example, parameters such as the time/temperature curve, the axial pressure on the lamination stack, and the determined stack height of the lamination stack are included in this in order to exert an influence on the stack height.

It is disadvantageous that the axial pressure on the lamination stack for reducing the stack height cannot be increased to an unlimited degree since there is a risk of heated hot-melt adhesive varnish being squeezed out—which can result in the loss of short-circuit safety of the lamination stack. Moreover, in the event that a stack height is below the tolerance range, this method does not enable an adjustment—and thus is in principle suited only to reducing the stack height. This method is therefore not universally usable and is also only suitable for slight adjustments to the stack height.

DISCLOSURE OF THE INVENTION

The object of the invention, therefore, is to modify a method for producing lamination stacks of the type described at the beginning so that exact lamination stacks can be produced in a particularly flexible way and with a high degree of reproducibility. In addition, the method should ensure a continuous and energy-efficient stacking of lamination stacks.

The invention attains the stated object by means of the features of claim 1.

If the hot-melt adhesive varnish layers of the stacked sheet metal parts are preheated to a first temperature, which is above a glass transition temperature $T_g$ of the hot-melt adhesive varnish and below the baking temperature of the hot-melt adhesive varnish, and are put under pressure in this preheated state, then the lamination stacking method according to the invention can offer the possibility of a flexible and precise adjustment of the stack height. By means of this layer-bonding using pressure and heat, it is namely possible to reduce irregularities between the individual sheet metal parts and thus to transfer the lamination stack much more precisely into the state that exists in the lamination stack after the baking of the hot-melt adhesive varnish layers.

A subsequent determination of the stack height hp of the individual lamination stacks composed of the stacked sheet metal parts by means of a measuring procedure can therefore be performed in a particularly precise way.

Then in the event that this determined stack height hpm falls below the tolerance range, if at least one additional sheet metal part is placed onto an end of the relevant lamination stack so as to thus adjust the stack height hp to a height within the tolerance range Δh from the predetermined desired stack height hs, it is possible to obtain geometrically accurate lamination stacks. This is still possible because the hot-melt adhesive varnish layer has not been heated to a temperature above the baking temperature, which permits a placement of one or several sheet metal parts onto the respective lamination stack without losses in quality. These geometrically accurate lamination stacks can then be conveyed to a baking procedure in order to fix their stack height and thus harden their hot-melt adhesive varnish layers.

For this purpose, the hot-melt adhesive varnish layers of each lamination stack are finally heated to a second temperature, which is greater than or equal to the baking temperature of the hot-melt adhesive varnish, and as a result, its sheet metal parts are baked onto one another by means of the hot-melt adhesive varnish layers.

In addition, this possibility of also increasing the height of lamination stacks after the stacking can contribute to simplifying the production process, for example by setting the number of stacked sheet metal parts so that the stack height tends to be undersized. In this way, it is possible to reliably avoid an oversizing, which as is known, usually cannot be sufficiently reduced by exerting pressure on the lamination stack—particularly not without also having to accept a squeezing-out of hot-melt adhesive varnish that may impair and/or jeopardize the function.

The method according to the invention is therefore distinguished by a high degree of reproducibility in the production of precise heights of lamination stacks that are composed of sheet metal parts.

In addition, the fact that the thermal energy of the preheating is used in the final heating can also increase the energy efficiency in the continuous production of lamination stacks.

Preferably, the at least one sheet metal part is placed onto the hot-melt adhesive varnish layer on the lamination stack. In other words, the sheet metal part is thus placed onto a warm hot-melt adhesive varnish layer, which can improve the bonding of the additional sheet metal part.

If the at least one sheet metal part is heated before it is placed onto the lamination stack, then it is possible to avoid a temperature drop. It is thus possible to improve the bonding of the additional sheet metal part. Preferably, the additional sheet metal part is heated to the first temperature.

Preferably, when the stack height is adjusted, the at least one sheet metal part is placed onto the end surface of the lamination stack under pressure. In this way, it is possible to further improve the bonding of the sheet metal part to the lamination stack.

In general, it should be noted that the sheet metal part that is placed on top can be the same as the stacked sheet metal parts, i.e. can have a hot-melt adhesive varnish layer—more particularly a backlack layer—on at least one of its flat sides.

Simple process conditions can be produced if the first temperature is in the range from 90° C. to 150° C., more particularly 100° C. to 120° C., and/or the second temperature is in the range from 180° C. to 250° C., more particularly from 180° C. to 220° C.

Short cycle times can be ensured if the determination of the stack height and/or the adjustment of the stack height take(s) place in the preheated state of the hot-melt adhesive varnish layers.

A continuous sequence of the method is enabled if the heating of the hot-melt adhesive varnish layers to the first temperature takes place in a stacking unit, which follows a stamping tool that exerts pressure on the hot-melt adhesive varnish layers in the stacking unit.

An alternative continuous sequence is conceivable if the heating of the hot-melt adhesive varnish layers to the first temperature takes place in a first furnace into which the lamination stacks composed of the stacked sheet metal parts are conveyed.

With this embodiment of the method, it is possible to simplify the handling in the flow from one unit to the next—for example in that the adjustment of the stack height takes place in a stack-controlling device and/or the baking of the sheet metal parts takes place in a second furnace.

The reproducibility of the method can be further improved if all of the lamination stacks are placed under the same high pressure. This also allows a trend analysis of the stack heights of the lamination stacks to be performed in a reproducible way. Preferably, the pressure is in the range from 2 to 10 N/mm$^2$, more particularly from 3 to 5 N/mm$^2$.

Preferably, the thickness of each sheet metal part is between 0.1 and 0.5 mm, more particularly from 0.1 to 0.3 mm, and/or the thickness of the hot-melt adhesive varnish layer of each sheet metal part is between 2 and 12 µm, more particularly from 4 to 8 µm. This makes it possible to satisfy particularly advantageous requirements for a high degree of reproducibility of the method.

The method can be particularly suitable for comparatively tall lamination stacks, for example if each lamination stack has more than 100 sheet metal parts.

In the event that the determined stack height of the lamination stack exceeds the desired stack height, if the number of sheet metal parts in the stacking of the sheet metal parts for the respective lamination stack is reduced by at least one, then this can be advantageous for an aim of giving preference to an undersizing of the stack height in the stacking of the lamination stacks—but at the very least, the method makes it possible to avoid an oversizing. It is thus possible to further increase the reproducibility of the method.

Among other things, in the event that the determined stack height of the lamination stack falls below the desired stack height, the number of sheet metal parts in the stacking of the sheet metal parts for the respective lamination stack can also be increased by at least one.

Preferably, the number of sheet metal parts that are stacked to form a lamination stack is always selected in such a way that the determined stack height falls below the desired stack height of the lamination stack by at least the thickness of one sheet metal part of the stacked sheet metal parts.

If the adjustment of the stack height occurs by placing one to five sheet metal parts, more particularly one to three sheet metal parts, onto the end surface of the lamination stack, then this can make for a sufficient increase of the stack height. In addition, such a comparatively slight adjustment in the number of sheet metal parts can prevent the possibility of other irregularities exerting an influence on the geometrical accuracy of the lamination stack.

High precision in the fit of the additionally placed sheet metal part relative to the stacked sheet metal parts of the lamination stack can be ensured if before the lamination stack is formed, the at least one sheet metal part is separated out prior to the stacking and is used for adjusting the stack height.

BRIEF DESCRIPTION OF THE DRAWINGS

The subject of the invention is shown in greater detail by way of example based on several exemplary embodiments. In the drawings:

FIGS. 1 and 2 show apparatuses 1*a*, 1*b* that are used to produce lamination stacks 2 whose stack height hp is within a tolerance range from a predetermined desired stack height. The lamination stacks 2 are preferably used for electromagnetic components, for example for electric machines.

Figure 1:
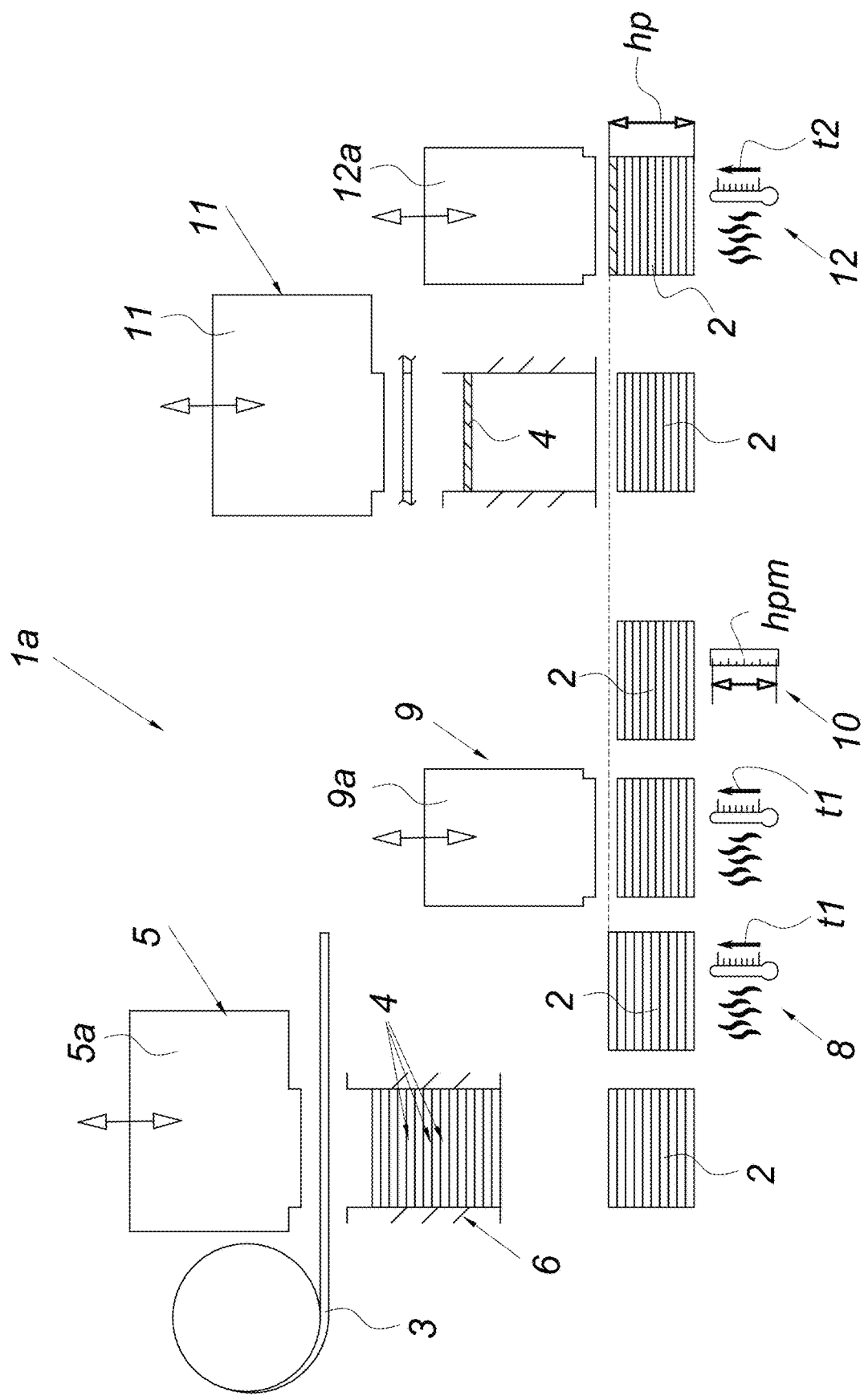
FIG. 1 shows a schematic depiction of a first apparatus for carrying out the method according to the invention.

To achieve this, the apparatus 1*a*—as shown in FIG. 1—cuts out multiple sheet metal parts 4 from an electrical steel strip 3.

The electrical steel strip 3 is coated with a preferably epoxy resin-based thermosetting hot-melt adhesive varnish layer 7, for example a backlack layer. The thermosetting or heat-setting hot-melt adhesive varnish layers 7 can consist of backlack. For example, a catalytic backlack can be used, e.g.: a backlack with a depot coating for achieving a more rapid complete reaction.

The cutting out of the sheet metal parts 4 is carried out with a stamping tool 5, which can also be part of a progressive stamping tool, not shown. It is also conceivable to use other devices for cutting out sheet metal parts 4, for example lasers.

Preferably, the thickness of each sheet metal part 4 is between 0.1 and 0.5 mm and the thickness of each hot-melt adhesive varnish layer 7 is between 2 and 12 µm.

Figure 3A:
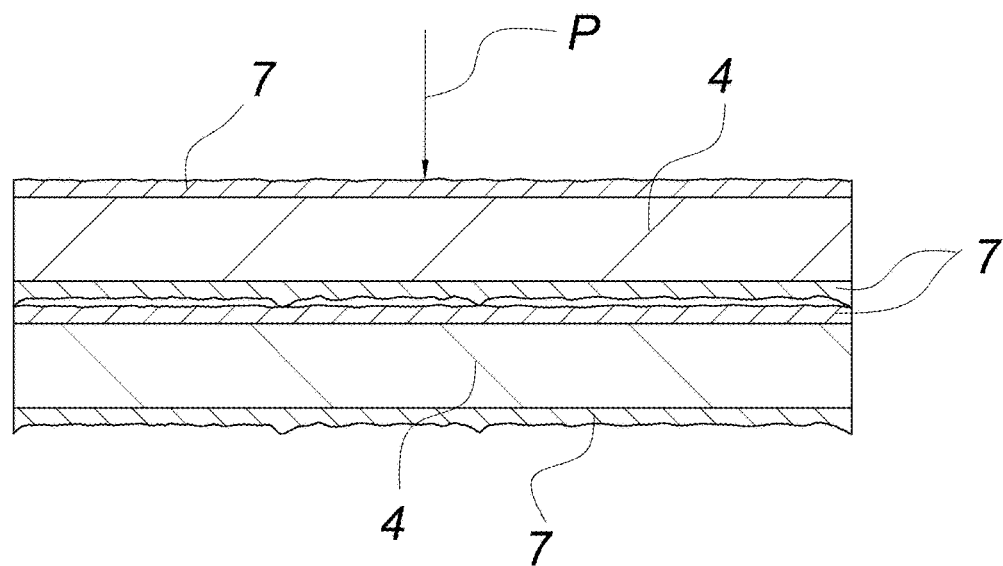
FIG. 3*a* shows stacked sheet metal parts in accordance with a method according to the prior art.

The stamping die 5a of the stamping tool 5 pushes the sheet metal parts 4 into a stacking unit 6. The sheet metal parts 4, which have a hot-melt adhesive varnish layer 7—namely a backlack layer—on at least one of their flat sides 4a, are stacked in this stacking unit 6. Two of these stacked sheet metal parts 4 are shown in FIG. 3a. All of the stacked sheet metal parts 4 exit the stacking unit 6 in lamination stacks 2 or are separated into lamination stacks 2 as they exit the stacking unit 6, which has not been shown in detail.

The lamination stacks 2 then undergo other processing steps—namely, the lamination stack 2 is conveyed into a first furnace 8 in order to thus preheat the hot-melt adhesive varnish layers 7 of the stacked sheet metal parts 4 to a first temperature t1, which is above a glass transition temperature $T_g$ of the hot-melt adhesive varnish 7 and below the baking temperature of the hot-melt adhesive varnish. Preferably, the first temperature t1 is 90° C. (90 degrees Celsius).

In a next step, the lamination stack 2 is conveyed into a press 9, which uses a pressing die 9a to exert pressure an axial pressing force P on the lamination stack 2—see pressing force P in FIG. 3a.

Figure 3B:
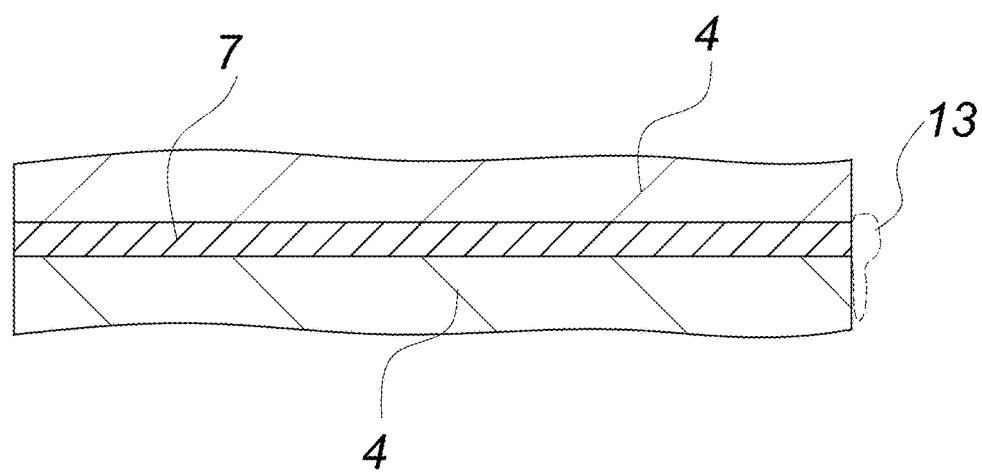
FIG. 3*b* shows stacked sheet metal parts in the method according to the invention.

This pressing force P smooths out irregularities, for example in the bonding of the hot-melt adhesive varnish 7 to a sheet metal part 4 or also to a hot-melt adhesive varnish 7 of an adjacent sheet metal part 4—see FIG. 3b in this regard.

The press 9 places all of the lamination stacks 2 under the same high pressure, which is in the range from 2 to 10 N/mm², preferably from 3 to 5 N/mm², namely 4 N/mm². This pressing force P can be sufficient, for example, to bring about a complete bonding of the hot-melt adhesive varnish layers 7 in order to thus eliminate the open regions between the hot-melt adhesive varnish layers 7, as shown in FIG. 3a. This can also significantly improve the bonding of the sheet metal parts 4 to one another, which further increases the durability of the lamination stacks 2 produced by means of the method according to the invention.

In addition, as shown in FIG. 1, the lamination stack 2 or more specifically, its hot-melt adhesive varnish layer 7, is kept at the first temperature t1 during the pressing.

This achieves all of the prerequisites for exact measurements of the stack height hp. For this purpose, in another step after the press 9, the lamination stack 2 is conveyed to a measuring device 10, which determines the stack height hpm. A wide variety of measuring methods can conceivably be used for this purpose, for example optical methods, manual methods, etc. or also methods in which the position of the pressing die 9a of the press 9 during or after the exertion of pressure on the lamination stack 4 is used as the basis for inferring its stack height hpm.

Preferably, the stack height hpm of the lamination stack 2 is determined when its hot-melt adhesive varnish layers are in the preheated state, which makes it possible to further increase the precision of the measuring method.

Based on this determined stack height hpm, an adjustment of the stack height hp is then carried out if need be—namely if this determined stack height hpm falls below a tolerance range Δh from a predetermined desired stack height hs.

In this case, in a stack-controlling device 11 situated after the measuring device 10, an additional sheet metal part 4 is placed onto the lamination stack 2 at one end 2a of the relevant lamination stack 2 in order to adjust the stack height hp to a height within the tolerance range Δh. In the examples, the tolerance range Δh corresponds largely (i.e. +/−) to the thickness d of one sheet metal part 4, i.e. +d/2 and −d/2, starting from the desired stack height hs.

This feature ensures the production of particularly exact lamination stacks 2.

Preferably, the stack height (hp) of the lamination stack 2 whose hot-melt adhesive varnish layers 7 are in the preheated state is adjusted, which facilitates the bonding of the sheet metal part 4 to the lamination stack 2.

In a subsequent step, the lamination stack 2 is conveyed into a second furnace 12 and in the latter, the hot-melt adhesive varnish layers 7 of the lamination stack 2 are finally heated to a second temperature t2, which is greater than or equal to the baking temperature of the hot-melt adhesive varnish, in order to bake their sheet metal parts 4 onto one another under pressure exerted by a furnace die 12a with a sufficiently long baking time. For example, the second temperature t2 is 190° C. (190 degrees Celsius) and the baking time is 15 minutes.

The method according to the invention is thus extremely flexible and produces exact lamination stacks 2 with a high degree of reproducibility.

In particular, however, the method is distinguished by the fact that sheet metal parts 4 can be stacked into lamination stacks 2 that tend to be undersized because it is in fact possible to supplement such undersized lamination stacks 2 with an additional sheet metal part 4. It is therefore unnecessary to bring oversized lamination stacks 2 to the correct dimension by exerting pressure during the baking, which is only possible to a limited degree anyway. It is thus possible to prevent a squeezing-out 13 of hot-melt adhesive varnish, as shown in FIG. 3b, which could jeopardize the short-circuit safety between the sheet metal parts 4 of the lamination stack 2.

Figure 2:
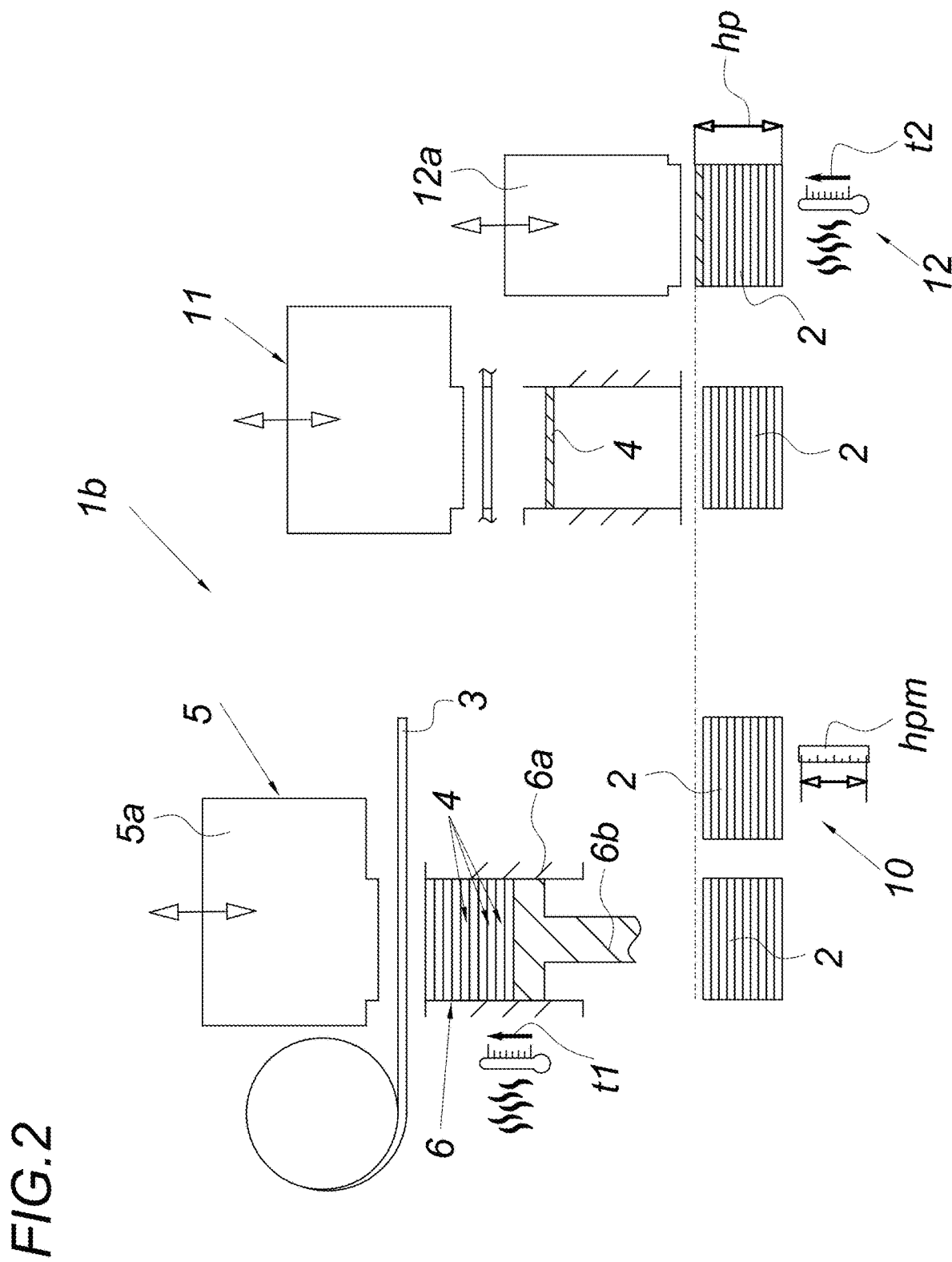
FIG. 2 shows a schematic depiction of a second apparatus for carrying out the method according to the invention.

The apparatus 1b according to FIG. 2 differs from the apparatus 1a in FIG. 1 essentially due to the fact that the preheating and exertion of pressure on the hot-melt adhesive varnish layers 7 are not carried out in the lamination stack 2; instead, they occur in the stacking unit 6.

For this purpose, the stacking unit 6 is provided with a wall heating 6a, which heats the hot-melt adhesive varnish layers 7 to the first temperature t1. By contrast, the stamping die 5a pushes the cut-out sheet metal parts 4 into the stacking unit 6 in opposition to the countervailing force of a counter support 6b—which results in an axial force being exerted on the stacked sheet metal parts 4 and thus exerts pressure on the preheated hot-melt adhesive varnish layers 7.

This method is distinguished by a smaller number of method steps and thus results in reduced cycle times in the stacking of lamination stacks 2 that have exact stack heights hp.

Figure 4A:
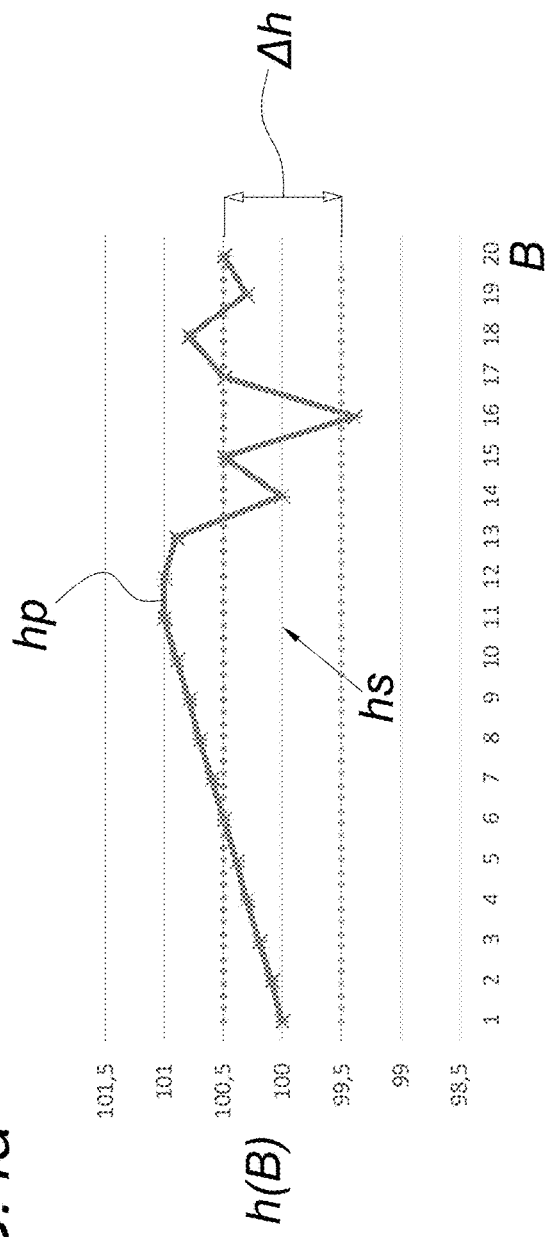
FIG. 4*a* shows a height curve of lamination stacks that have been stacked in accordance with a method according to the prior art.

FIG. 4a shows a method for stacking lamination stacks according to the prior art in which a trend analysis of the height H, depicted over twenty lamination stacks, is carried out. As is clear, in the lamination stacks with the numbers 7 to 13, an oversizing has occurred; these stacks are thus outside the upper limit of the tolerance range Δh from a desired stack height hs. This trend is detected by the trend analysis and the number of stacked sheet metal parts is reduced in such a way that the stack height hp once again lies within the required tolerance range Δh from a desired stack height hs. Since the stack height in the trend decreases inversely to the preceding lamination stacks, there is suddenly an undersizing in the lamination stack with the number 16. This cannot be corrected in the prior art and generates waste. The same is true at least for the lamination stacks with the numbers 7 to 13, whose oversizing can no longer be compensated for by pressure without the risk of short circuits due to the hot-melt adhesive varnish being squeezed out.

Figure 4B:
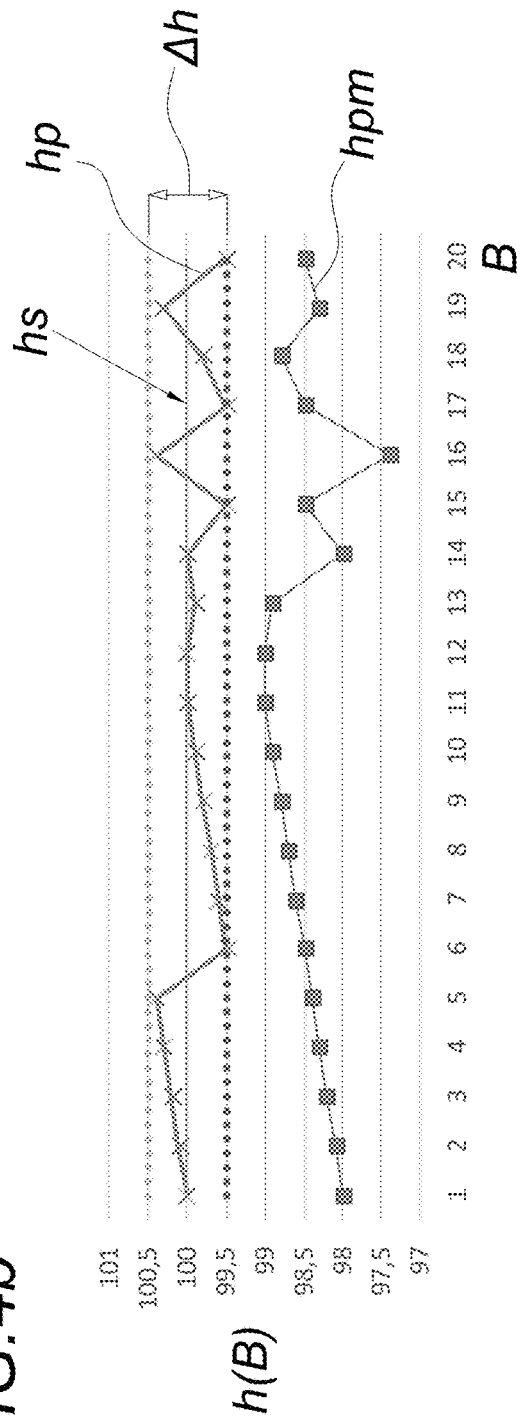
FIG. 4*b* shows a height curve of lamination stacks that have been stacked in accordance with the method according to the invention.

FIG. 4b shows the method according to the invention in which there is the option of adding at least one additional sheet metal part 4 as needed to lamination stacks 2 formed from stacked sheet metal parts 4. For this reason, the method according to the invention can also be carried out so that the number of stacked sheet metal parts 4 tends to be undersized relative to the tolerance range Δh. It is thus possible to disregard known trend analyses since—as mentioned above—the stack height hp can always be adjusted to within the tolerance range Δh from a desired stack height hs by adding sheet metal parts.

The number of added sheet metal parts 4 can remain low and can preferably total from one to five sheet metal parts 4 in order to ensure the reproducibility of the method. For example, according to FIG. 4b, the lamination stacks with the numbers 1, 2, 3, 4, 5, 15, and 19 are each missing two stacked sheet metal parts 4, lamination stack 16 is missing three stacked sheet metal parts 4, and the other lamination stacks are each missing one stacked sheet metal part 4, as is clear from the determined stack height hpm.

The stacking unit 6 adds the respectively missing sheet metal parts 4, which ensures that a produced stack height hp is within the tolerance range Δh from the desired stack height hs. The method according to the invention can therefore produce geometrically accurate lamination stacks 3 without waste.

This adjustment of the stack height hs after the stacking can also be integrated into the method in a comparatively unproblematic way. This is due simply to the fact that the cycle time is in any case essentially predetermined by the chronologically longer hardening time during the final heating.

The invention claimed is:

1. A method for stacking sheet metal parts made from an electrical steel strip or sheet in order to form lamination stacks each having a stack height within a tolerance range from a predetermined desired stack height, comprising:
   stacking a plurality of sheet metal parts, which have a hot-melt adhesive varnish layer on at least one flat side of each of the plurality of sheet metal parts, onto one another, defining stacked sheet metal parts,
   preheating the hot-melt adhesive varnish layers of the stacked sheet metal parts to a first temperature, which is above a glass transition temperature of the hot-melt adhesive varnish and below a baking temperature of the hot-melt adhesive varnish, and in this preheated state, putting the hot-melt adhesive varnish layers of the stacked sheet metal parts under pressure, then
   determining the stack height of the individual lamination stacks composed of the stacked sheet metal parts using a measuring procedure and when this determined stack height falls below the tolerance range, placing at least one additional sheet metal part onto an end surface of the relevant lamination stack so as to adjust the stack height to a height within the tolerance range from the predetermined desired stack height, and then
   finally heating the hot-melt adhesive varnish layers of each lamination stack to a second temperature, which is greater than or equal to the baking temperature of the hot-melt adhesive varnish, and as a result, the sheet metal parts of each lamination stack are baked onto one another by the hot-melt adhesive varnish layers.

2. The method according to claim 1, wherein at least one sheet metal part is placed onto the hot-melt adhesive varnish layer on the lamination stack and the at least one sheet metal part is optionally heated before the at least one sheet metal part is placed onto the lamination stack and the at least one sheet metal part is optionally placed onto the hot-melt adhesive varnish layer under pressure.

3. The method according to claim 1, wherein the first temperature is in a range from 90° C. to 150° C., and/or the second temperature is in a range from 180° C. to 250° C.

4. The method according to claim 1, wherein the determining of the stack height and/or the placing at least one additional sheet metal part onto the end surface of the relevant lamination stack so as to adjust the stack height is/are carried out in the preheated state of the hot-melt adhesive varnish layers.

5. The method according to claim 1, wherein the heating of the hot-melt adhesive varnish layers to the first temperature takes place in a stacking unit, which follows a stamping tool that exerts pressure on the hot-melt adhesive varnish layers in the stacking unit.

6. The method according to claim 1, wherein the preheating of the hot-melt adhesive varnish layers to the first temperature takes place in a first furnace into which the lamination stacks composed of the stacked sheet metal parts are conveyed.

7. The method according to claim 6, wherein the adjustment of the stack height takes place in a stack-controlling device and/or the baking of the sheet metal parts takes place in a second furnace.

8. The method according to claim 1, wherein all of the lamination stacks are placed under the same high pressure and/or the pressure is in the range from 2 to 10 N/mm².

9. The method according to claim 1, wherein a thickness of each sheet metal part is between 0.1 and 0.5 mm and/or a thickness of the hot-melt adhesive varnish layer of each sheet metal part is between 2 and 12 μm.

10. The method according to claim 1, wherein each lamination stack has more than 100 sheet metal parts.

11. The method according to claim 1, wherein in the event that the determined stack height of the lamination stack exceeds the desired stack height, the number of sheet metal parts in the stacking of the sheet metal parts for the respective lamination stack is reduced by at least one.

12. The method according to claim 1, wherein in the event that the determined stack height of the lamination stack falls below the desired stack height, the number of sheet metal parts in the stacking of the sheet metal parts for the respective lamination stack is increased by at least one.

13. The method according to claim 1, wherein the number of sheet metal parts that are stacked to form a lamination stack is always selected in such a way that the determined stack height falls below the desired stack height of the lamination stack by at least a thickness of one sheet metal part of the stacked sheet metal parts.

14. The method according to claim 1, wherein the placing at least one additional sheet metal part onto the end surface of the relevant lamination stack so as to adjust the stack height occurs by placing one to five sheet metal parts onto the end surface of the lamination stack.

15. The method according to claim 1, further comprising separating out at least one of the sheet metal parts prior to the stacking and using the at least one of the sheet metal parts for adjusting the stack height before forming the lamination stack.

* * * * *